No. 663,577. Patented Dec. 11, 1900.
C. W. LEVALLEY.
SHAFT HANGER.
(Application filed Apr. 4, 1899.)
(No Model.) 2 Sheets—Sheet 1.
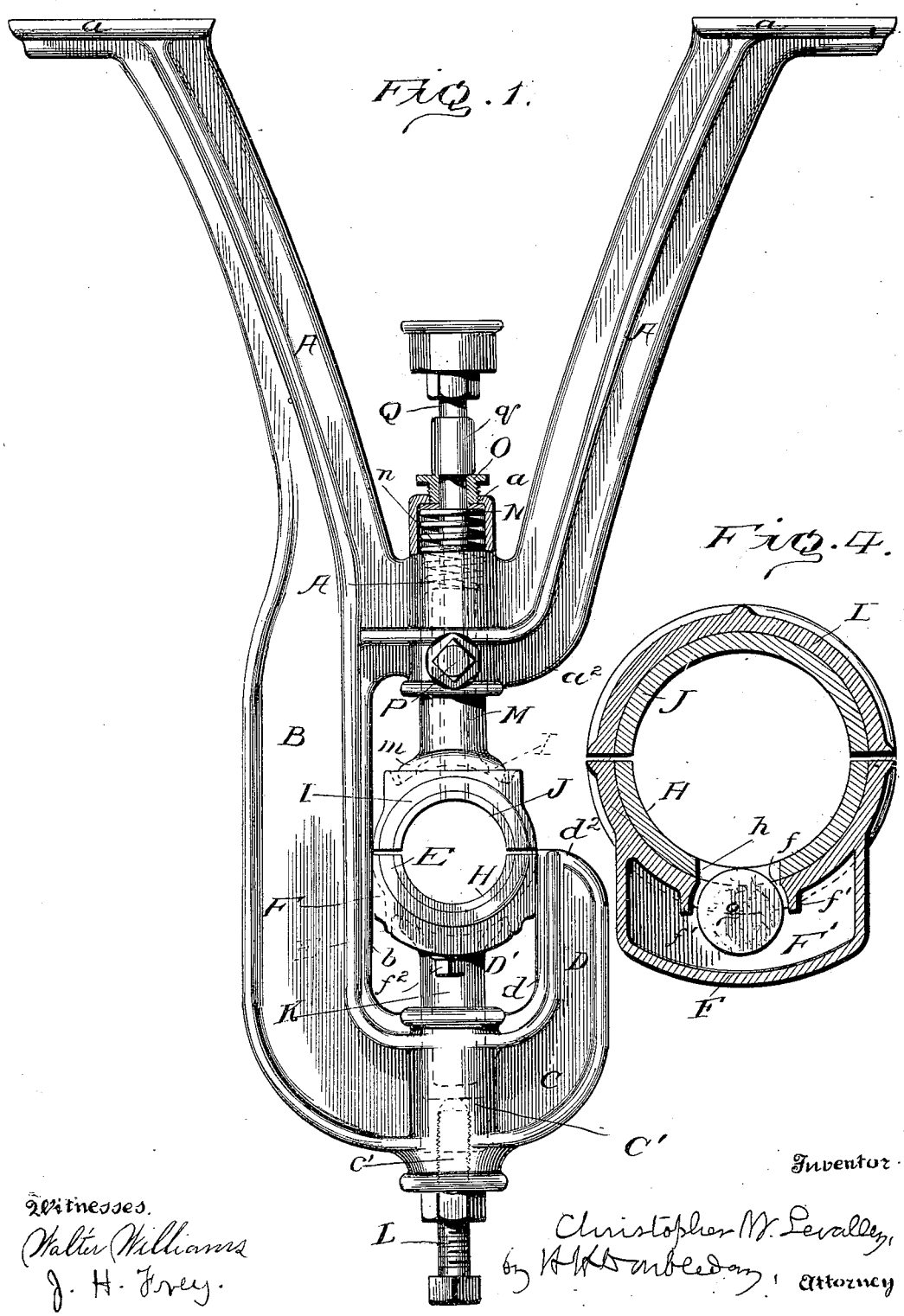
Witnesses
Walter Williams
J. H. Frey.
Inventor
Christopher W. Levalley,
by H H Dunbeedon, Attorney No. 663,577. Patented Dec. 11, 1900.
C. W. LEVALLEY.
SHAFT HANGER.
(Application filed Apr. 4, 1899.)
(No Model.) 2 Sheets—Sheet 2.
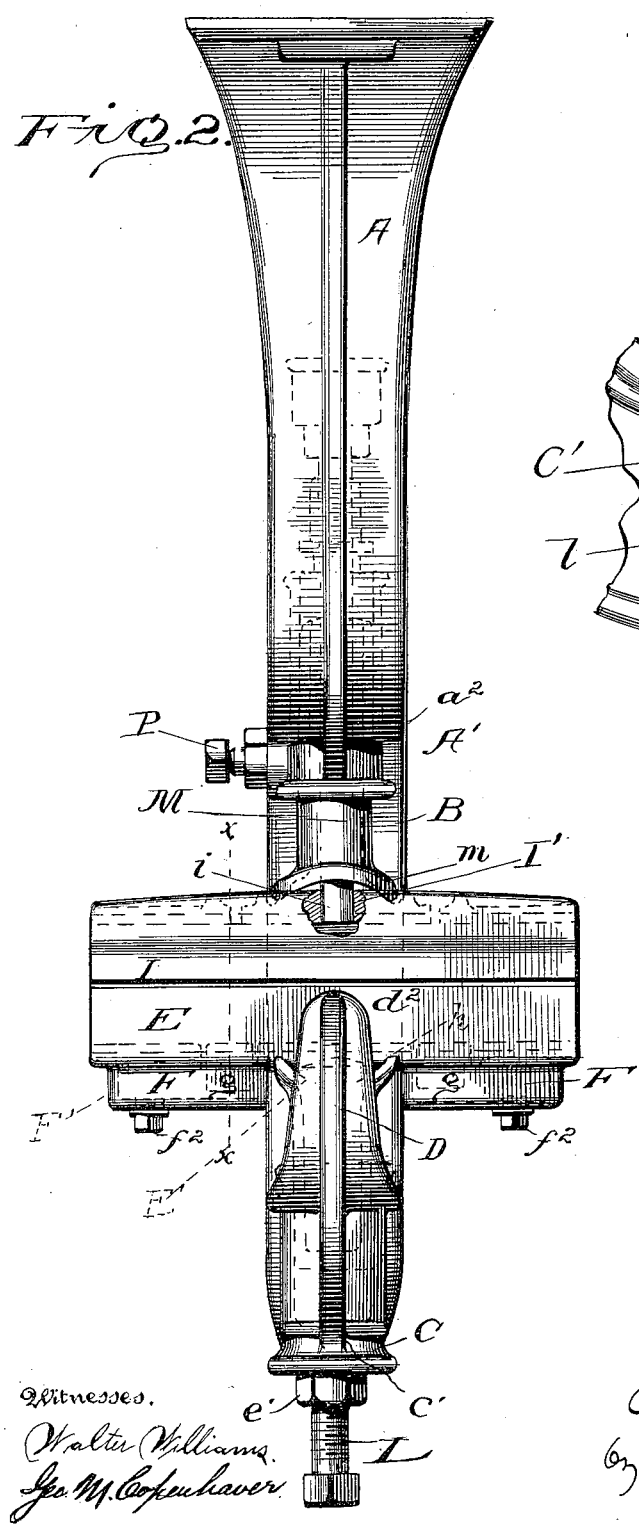
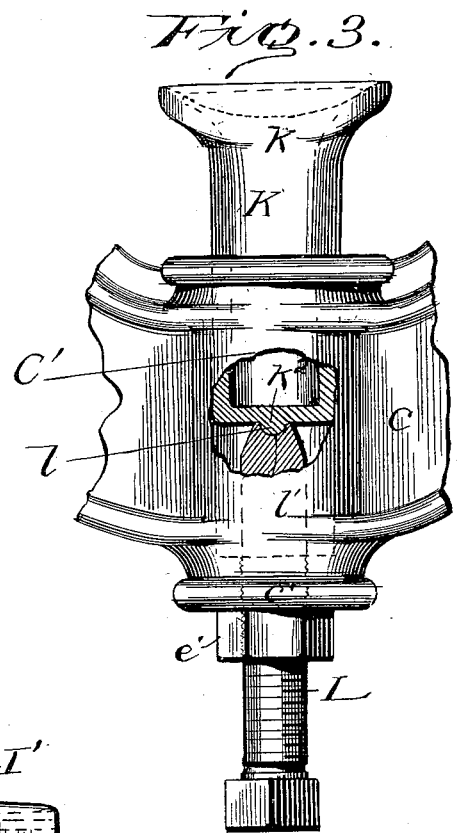
Witnesses.
Walter Williams
Geo. M. Copenhaver
Inventor
Christopher W. Levalley,
By H H Danberg
Attorney.
THE NORRIS PETERS CO., PHOTO-LITHO., WASHINGTON, D. C.

UNITED STATES PATENT OFFICE.

CHRISTOPHER W. LEVALLEY, OF MILWAUKEE, WISCONSIN.

SHAFT-HANGER.

SPECIFICATION forming part of Letters Patent No. 663,577, dated December 11, 1900.

Application filed April 4, 1899. Serial No. 711,751. (No model.)

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Shaft-Hangers, of which the following is a specification, reference being had therein to the accompanying drawings.

Figure 1 is a side elevation. Fig. 2 is an edge view. Fig. 3 is an enlarged detail, partly in section. Fig. 4 is a transverse section on the dotted line $x\ x$, Fig. 2.

Like reference-letters refer to similar parts in all the figures.

A A are the bracket-legs of the depending V-shaped upper portion of the frame, the flat flanges of which are adapted to be bolted to the ceiling of an apartment in any usual or approved manner.

A' is a vertical tubular or sleeve-like socket at the lower ends of the legs and preferably cast in one and the same piece therewith. $a'$ is an inward-projecting flange at the upper end of this socket and is screw-threaded.

B C D represent the lower substantially J-shaped portion of the frame, all of which is preferably cast integral.

C' is a vertical tubular or sleeve-like socket in the bend of the J-shaped portion. At the lower end of the socket C' there is a screw-threaded bearing $c'$ for an adjusting-screw L, to be hereinafter described.

The inner walls or faces of the parts B D are flat and parallel to each other, as is indicated at $b\ d$, Fig. 1, whereby there is formed a partially-inclosed space D' for a shaft-boxing, to be described, with an open space between the upper end of the part D and the adjacent lower end of the tubular socket A'.

A convenient form of shaft-boxing which I propose to use comprises a lower semitubular section E, of any desired length, provided at about its center with a parti-spherical enlargement E', which is or may be hollowed out or concaved in its center, so as to form an annulus or ring-shaped bearing-surface adapted to rest upon a removable and preferably-adjustable support, to be described. Upon either side of the center there is an enlargement F, with parallel vertical sides which fit somewhat closely within the space D' and engage with the flat faces $b\ d$ and hold the boxing from rotation with the shaft mounted therein. (See particularly Fig. 1.) There is also upon either side of the center an oil-receptacle F', preferably cast integral with the other parts of the boxing and formed with a quite large opening $f$ near its inner end and with downward-projecting lips or flanges $f'f'$, which are shown as having curved inner faces to facilitate the rotation of an oil-carrying roller of cork $g$ or some other usual or approved material, which is adapted to be rotated by its engagement with the rotating shaft, up against which it will be held by the oil, and to thereby lubricate the shaft in the well-known manner, which need not be further explained.

H is a lining—say of Babbitt metal or similar material—having two openings $h\ h$, which correspond substantially in size and location to the openings $f\ f$ into the oil-receptacles for the reception of the oil-carrying rollers. (See particularly Fig. 4.)

$h'$ is an oil-groove extending lengthwise through nearly or quite the entire length of the lining-section H and connecting the oil-openings $h\ h$.

I is the upper section of the shaft-boxing, provided about midway between its ends with a parti-spherical enlargement I', the arc of its upper engaging surface representing part of a circle struck from a point on the axis of the shaft-bearing immediately below—that is to say, about midway between its ends—the form of this bearing-surface being the same substantially as that of the one marked E' on the lower section, the centers of their arcs coinciding. $i$ is an oil-hole through this upper section and through a lining J, so that oil introduced therethrough will as the shaft rotates find its way down around into the oil-receptacles F' F'.

Each oil-receptacle has a drainage or emptying opening provided with a screw-threaded closing-plug $f^2$.

The shaft-bearing is supported from below upon an adjustable support K, having a shank part which is fitted to slide up and down within the tubular socket C' and is expanded at its upper end into a sort of cup-shaped seat $k$, the inner upper face of which is parti-spherical in form and of such outline as to fit quite closely the correspondingly-shaped under surface of the parti-spherical enlargement $E'$ of the lower semitubular section $E$ of the shaft-bearing, these engaging parts thus constituting a sort of ball-and-socket joint which will permit some freedom of movement of the shaft-bearing without disturbing other adjustments thereof.

L is an adjusting-screw seated in the screw-threaded bearing $c'$ and engaging at its upper end with the lower end $k^2$ of the support K, which is formed, preferably, with a parti-spherical knob projecting down from its center, as at $l$, (see Fig. 3,) to rest upon the correspondingly-shaped upper end $l'$ of the adjusting-screw L, which carries also a jam-nut $e$.

I have shown this support K as being hollow, which form I recommend as being lighter and cheaper.

Above the shaft-bearing there is a bearing having a tubular shank M, fitted to slide up and down within the tubular socket $A'$ and provided at its lower end with a sort of cup-shaped seat $m$, having an inner parti-spherical form adapted to engage with the parti-spherical enlargement $I'$ on the upper surface of the member I of the shaft-bearing. O is a gland-like adjusting-screw seated in the screw-threaded flange $a'$ at the upper end of the said tubular socket $A'$. N is a spring disposed within the said socket, with its lower end resting upon the upper end of the tubular shank M, its upper end being pressed down by means of the adjusting-screw O, with, preferably, a washer $n$ interposed between the screw and the spring to insure a proper operation of these parts. (See particularly Fig. 1.

P is a set-screw mounted in the tubular socket $A'$ and adapted to engage with the tubular shank M of the upper bearing and prevent vertical movement thereof when required, and it will be seen that by the use of this set-screw the bearing can be held up in such position as may be desired in order to facilitate the removal and replacement of the shaft, the shaft-bearing, or both, as occasion may indicate. The bearing may be firmly locked down upon the shaft-bearing or left free to be pressed down by the spring, the amount of force thus exerted by said spring being regulated by the screw O.

Q indicates an oil-tube which passes through the hollow screw O, the upper bearing, the upper section of the shaft-bearing, and the babbitting J, the feeding-cup at the upper end of the tube being connected to the tube proper by a coupling $q$ at such point that when the upper bearing is elevated to its highest point the nut will engage with the coupling and hold the lower end of the oil-tube high enough to facilitate the taking out and putting in of any of the parts below either bodily sidewise through the throat between the adjacent portions $a^2 d^2$ of the frame or endwise, as the case may be.

It is obvious that the amount of pressure of the upper bearing upon the shaft-bearing may be varied by using springs of different degrees of tension, as well as by means of the adjusting-screw O, though for convenience I prefer the screw. So, also, the washer $n$ might be omitted, especially in case the wire or rod of which the spring is made be rectangular in cross-section and of such diameter as to fit somewhat closely to the oil-tube Q.

Having now described the best mode known to me for carrying out my invention, I wish to state that I do not desire to be limited to the precise details of construction shown, because modifications thereof will readily suggest themselves to a person skilled in the art without departing from the spirit of my improvement or going outside of its scope.

What I claim is—

1. In a shaft-hanger, the combination with the depending frame, of the shaft-bearing provided with the parti-spherical enlargement upon its lower surface, of the support provided with a correspondingly-shaped seat at its upper end, a vertical tubular socket surrounding the lower end of the support, and an adjusting-screw mounted in the lower end of the said socket, substantially as set forth.

2. In a shaft-hanger, the combination with the depending frame of the shaft-bearing formed of separate sections, the shaft-bearing being provided with parti-spherical bearing-surfaces upon its upper and lower surfaces, respectively, a support for the shaft-bearing provided with a cup-shaped seat adapted to fit the lower parti-spherical bearing-surface of the shaft-bearing, means for adjusting the said support, an upper bearing provided at its lower end with a cup-shaped seat adapted to engage with and fit the upper parti-spherical bearing-surface of the shaft-bearing, and means for holding this upper bearing in engagement with the shaft-bearing, substantially as set forth.

3. In a shaft-hanger, the combination with the depending frame provided with means for supporting from below a shaft-bearing, of an upper bearing mounted above said supporting devices and free to rise and fall, and a spring for pressing the said bearing downward, substantially as set forth.

4. In a shaft-hanger, the combination with a depending frame having a partially-inclosed space for a shaft-bearing and two vertical tubular sockets one above said space and one below it, of a support mounted in the socket below the said space, a yielding bearing above the space, and means for locking the upper bearing positively in position, substantially as set forth.

5. In a shaft-hanger, the combination of a depending frame provided with a partially-open space for a shaft-bearing and a tubular socket above said space, an upper bearing having a tubular shank mounted in the socket, a spring within the socket, and an oil-tube disposed within the spring and the tubular shank, substantially as set forth.

6. The combination with the shaft-bearing formed of separate sections, of a support for the lower section of the shaft-bearing, a movable bearing for the upper section resting upon the same and holding it in place, and means for lubricating the shaft-bearing extending through the bearing for the upper section of the shaft-bearing, substantially as set forth.

In testimony whereof I affix my signature in presence of two witnesses.

CHRISTOPHER W. LEVALLEY.

Witnesses:
W. C. FRYE,
V. I. KLOFAUDA.